United States Patent [19]

Freese

[11] 4,193,598
[45] Mar. 18, 1980

[54] VIDEO GAME SYSTEM

[76] Inventor: Jens Freese, Am Sandberg 92, Frankfurt am Main, Fed. Rep. of Germany, 6000Ffm

[21] Appl. No.: 885,250

[22] Filed: Mar. 10, 1978

[30] Foreign Application Priority Data

Mar. 16, 1977 [DE] Fed. Rep. of Germany ....... 2711421

[51] Int. Cl.² ............................................... A63F 9/22
[52] U.S. Cl. ................................. 273/313; 273/85 G; 273/DIG. 28
[58] Field of Search ................ 273/1 E, 85 G, 101.2, 273/DIG. 28

[56] References Cited

U.S. PATENT DOCUMENTS

| 3,659,285 | 4/1972 | Baer et al. | 273/85 G |
| 4,093,221 | 6/1978 | Dash | 273/85 G |

Primary Examiner—Anton O. Oechsle
Attorney, Agent, or Firm—Erwin Salzer

[57] ABSTRACT

A video game system for simulating the functions of vehicles or groups of vehicles represented by spots on the screens of television sets or television projectors controlled by individual control sets is provided. The control sets and television sets are connected to a common central control for the supervision of presence of a vehicle within the field of visibility of another vehicle, whereby the representation of both vehicles on the screens of both concerning television sets is performed.

3 Claims, 4 Drawing Figures

VIDEO GAME SYSTEM

BACKGROUND OF THE INVENTION

This invention relates to a video game system for simulating the functions of vehicles or groups of vehicles represented by spots on the screens of television sets or television projectors controlled by individual control sets. All control sets and television sets are connected to a common central control, whereby the common central control limits the presentation of vehicle or a group of vehicles to the screen of the particular television set.

Games using a play-board common for all participants like a chess board are bearing the deficiency in certain applications, that the opponents are informed about each movement or action undertaken by a player.

Especially in games for the performance of land or sea battles the use of a common play-board creates an unrealistic process of the game, since all actions and positions of the opponent are known to all players at the same moment.

There are known games with individual play-boards for each player with the positions of ships fixed at the start of the game. Since there is no possibility for moving the positions during the performance of the game, this type of game offers also no alternative to the above mentioned game using a common play-board.

A different and new kind of game is using the screen of a television set as a play-board thus offering the possibility of a free movement of spots marking a ball or a symbol marking a racket or a vehicle. The generation of these spots or symbols is performed by a control set containing controls as potentiometers activated by the players for changing the pulsing intervals of horizontal and vertical generators. The signals of the two generators are added by logic circuits and mixed with the carrier frequency of another generator so that the control set can be connected to the antenna input of the television set.

Games of this kind are using a common television set for all participants which in some applications is necessary (tennis, hockey and other ball games) and in other games useful, since the main purpose of the game even when it is used for performing a battle lies in the triggering of shots by the participants on objects moving over the screen.

The principal object of the present invention is to provide a possibility for performing a land or sea battle or a fox-hunting using different television sets controlled by individual control sets whereby the presentation of vehicles (tanks, ships) or groups of vehicles (military units, flotillas) represented by spots on the screen of the particular television set can be extended to the screens of other television sets.

SUMMARY OF THE INVENTION

A video game system for simulating the functions of vehicles or groups of vehicles represented by spots on the screens of television sets or television projectors controlled by indivdual control sets and all control sets and television sets are connected to a common central control whereby the said common central control limits the presentation of a vehicle or a group of vehicles to the screen of the particular television set and other vehicles or groups of vehicles controlled by different control sets are represented on other screens when their position is within the assumed field of visibility (horizon) of the particular vehicle or group of vehicles.

The principal advantage of the invention lies in the addition of an important factor to the performance of the above mentioned games. All participants of the game can control the assigned vehicles which are only visible on the screen of their television set and can use the whole screen as a play-board. None of the players knows about the positions and actions of the vehicles of the opponents as long as one of their vehicles is not coming within the range of visibility of a vehicle of the opponent. This is used as a criteria for the presentation of a vehicle on the screen of the particular television set which is not controlled by the assigned control set.

The invention makes games of the above mentioned kind more interesting and more realistic since the factor of surprise causes an enrichment of the game.

DESCRIPTION OF PREFERRED EMBODIMENT

Figure 1:
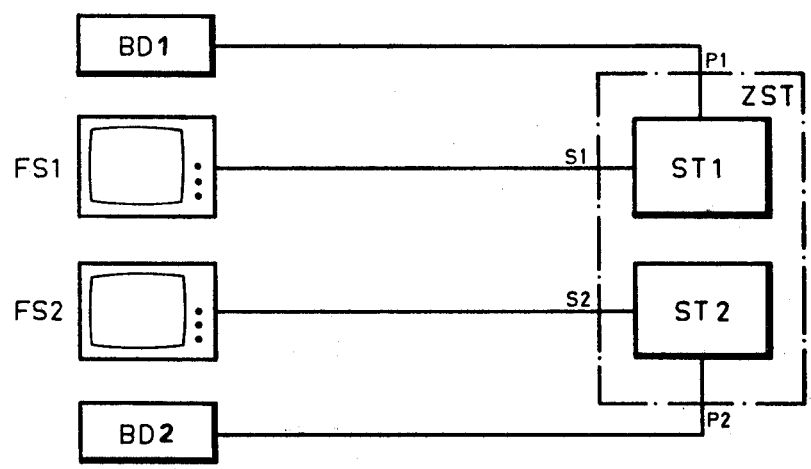
FIG. 1 is a block diagram embodying the present invention.

FIG. 1 shows the principal set-up of the video game system for two television sets. The video game system can be also adapted for more than two television sets, also television projectors can be used instead of the television sets.

A television set FS1 is connected via line S1 to control unit St1 to which the individual control set BD1 is connected via line P1. The same applies to the television set FS2 and the control unit BD2. The control units ST1 and St2 are forming a part of the common central control ZST.

Figure 2:
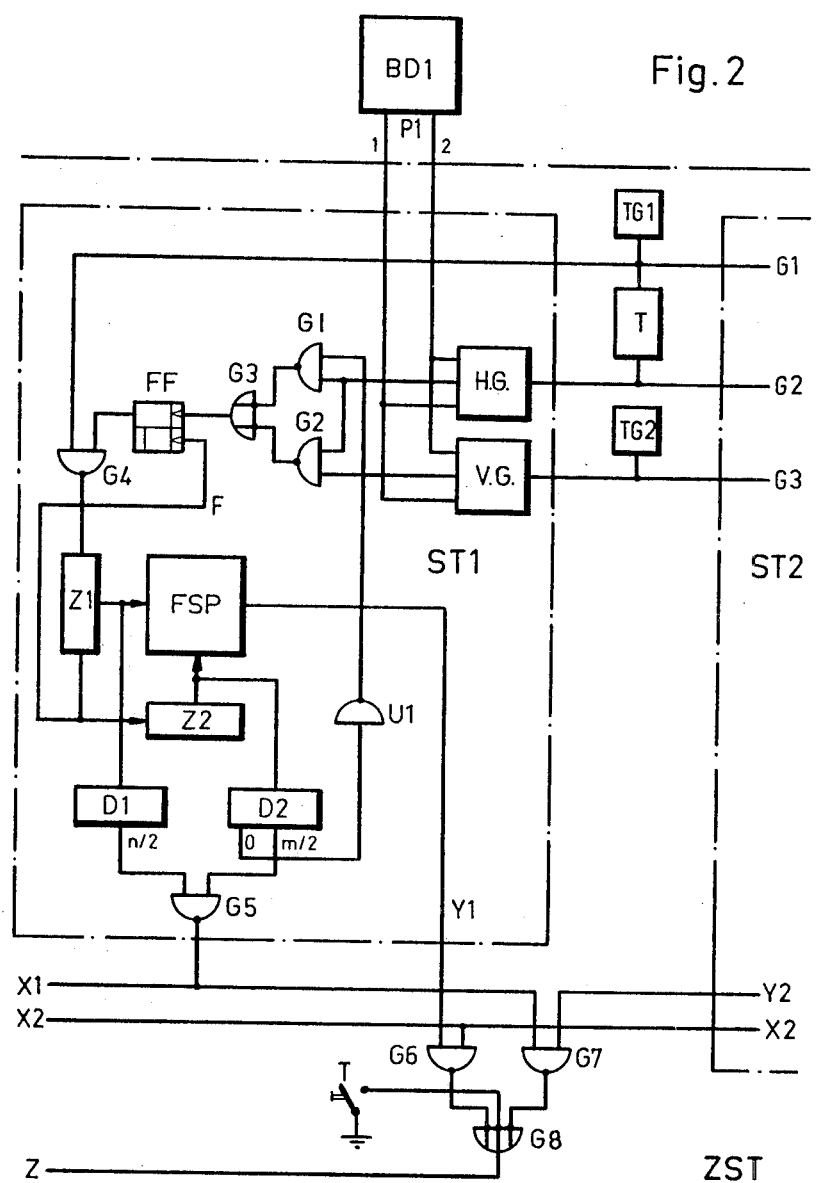
FIG. 2 is a diagram of the circuitry of the individual control unit within the common central control.

FIG. 2 shows a more detailed circuit diagram of the control unit ST1 which is identical with the control unit ST2. Both control units are connected to a common pulse generator TG1 which provides a steady pulse train for both control units ST1, ST2 on wire G1 with a frequency equal to the dots appearing per line (the frequency is the product of the dots per line times the number of the lines per frame times the number of frames per second). This frequency is also supplied to a frequency divider T on wire G1, which generates a frequency equal to the line jump on wire G2 connected to the horizontal generators HG of the control units ST1 and ST2. A second generator TG2 generates a frequency equal to the number of frames per second on wire G3 connected to the vertical generators VG of the control units ST1 and ST2. The frequencies of both generators TG1 and TG2 depend on the television system standard of the television sets to be used for the video game.

The horizontal generator HG and the vertical generator VG are generating the invisible auxiliary spot H, which is a spot removed by a certain horizontal and vertical value from the actual represented spot on the screen of the television set marking the position of a vehicle. The function of the auxiliary spot H is described in detail in the following paragraph.

The position of the auxiliary spot H is generated with each frame by the pulses of the horizontal generator HG and vertical generator VG. These two generators are triggered with each line jump or frame jump respectively, normally they would produce a spot on a position on the beginning of the first line of each frame. By delaying the trigger pulses appearing on the wires G2 and G3 within the horizontal HG and the vertical generator VG it is possible to generate a spot on all possible positions all over the whole screen of the television set, whereby the position is a function of the delay times of the two generators HG and VG.

The control sets BD1 and BD2 are provided with potentiometers for the control of the spots. One potentiometer controls via line 1 of the connection P1 the delay time of both generators HG and VG thus controlling the motion of the spot with respect to the direction and another potentiometer controls via the line 2 of the connection P1 the delay time of both generators HG and VG thus controlling the speed of the spot which is as said before in both cases the invisible auxiliary spot H. Horizontal and vertical generators of this kind are necessary for all video games and are described in detail in the Magazine Elector No. 10, October 1975 and in U.S. Pat. No. 3,659,285, whereby the functions of the generator TG1 and the frequency divider T together are the same of the Horizontal Sync Generator 31 shown in the drawings (FIG. 4) of the above mentioned Patent, the same applies to the generator TG2, whose functions are identical to those of the Vertical Sync Generator 32. Further details of the horizontal (H.G.) and the vertical (V.G.) generators are described in the same U.S. Patent referring to FIG. 4 (dot horizontal delayed WH pulses, dot vertical delayed WV pulses) for example. In general this U.S. Patent describes all kinds of dot generators for the motion of dots on the screens of television sets.

The horizontal generator HG generates a signal which appears somewhere between the beginning and the end of a line, depending on the position of the spot H, this occurs with every line within a frame and determines the horizontal value of the position of spot H. The vertical generators VG generate one signal per frame for the vertical value of the position of spot H.

The output of the horizontal generator HG and the output of the vertical generator VG are connected to the NAND-gate G2, which produces a signal at its output at the coincidence of the signals of the two said generators HG and VG. This signal sets the bistable flip flop FF via the OR-gate G3.

The signal at the output of the flip flop FF as enable signal is coupled to the NAND-gate G4, which effects the gate to transmit the pulses generated by the frequency generator TG1 on wire G1. The output of the NAND-gate G4 is connected to the input of the counter Z1 so that the counter is stepped up with each pulse to its final position n. In this position the bistable flip flop FF is reset via a connection of the output of counter Z1. In this position of the flip flop FF the NAND-gate G4 is blocked, so that no further pulses are reaching the counter Z1. At this final position n of counter Z1 the generated signal also switches the counter Z2 to the next step via a connection between the output of counter Z1 and the input of counter Z2.

With the next signal of the horizontal generator HG (the next signal out of the vertical generator VG will appear with the following frame causing the NAND-gate G2 to be blocked up to this moment) the bistable flip flop FF is set by the release of NAND-gate G1 via the OR-gate G3, whereby the release of the NAND-gate G1 is performed by the output O of the decoder D2 connected to counter Z2. The output O is connected to the NAND-gate G1 via inverter U1. The output O delivers the blocking signal for the NAND-gate G1 as long as counter Z2 remains in the rest position (O).

The enabling of the NAND-gate G4 by the set bistable flip flop FF causes the stepping up of counter Z1 by the pulse train delivered by frequency generator TG1.

At the final position of counter Z1 a signal is generated which causes the counter Z2 to be switched to the next step and the reset of the bistable flip flop FF. This operation repeats with each signal out of the horizontal generator HG up to the moment, when counter Z2 comes to its rest position (O) blocking the NAND-gate G1 via the output O of decoder D2. The whole procedure repeats with each frame.

The counters Z1 and Z2 have a counting capacity of n and m steps respectively, whereby n and m are equal. The outputs of the two decoders D1 and D2 which are connected to the counters Z1 and Z2 respectively marking the middle of the counting capacity bearing the sign n/2 and m/2 are connected to a NAND-gate G5. At the output n/2 one signal appears with each line as long as the counter Z1 is stepped up while at the output m/2 one signal appears per frame. The signal at the output of NAND-gate G5 generated at the coincidence of the signals of the outputs n/2 and m/2 is the actual signal which causes the presentation of the spot on the television screen. This signal appears on the wire X1.

Figure 3:
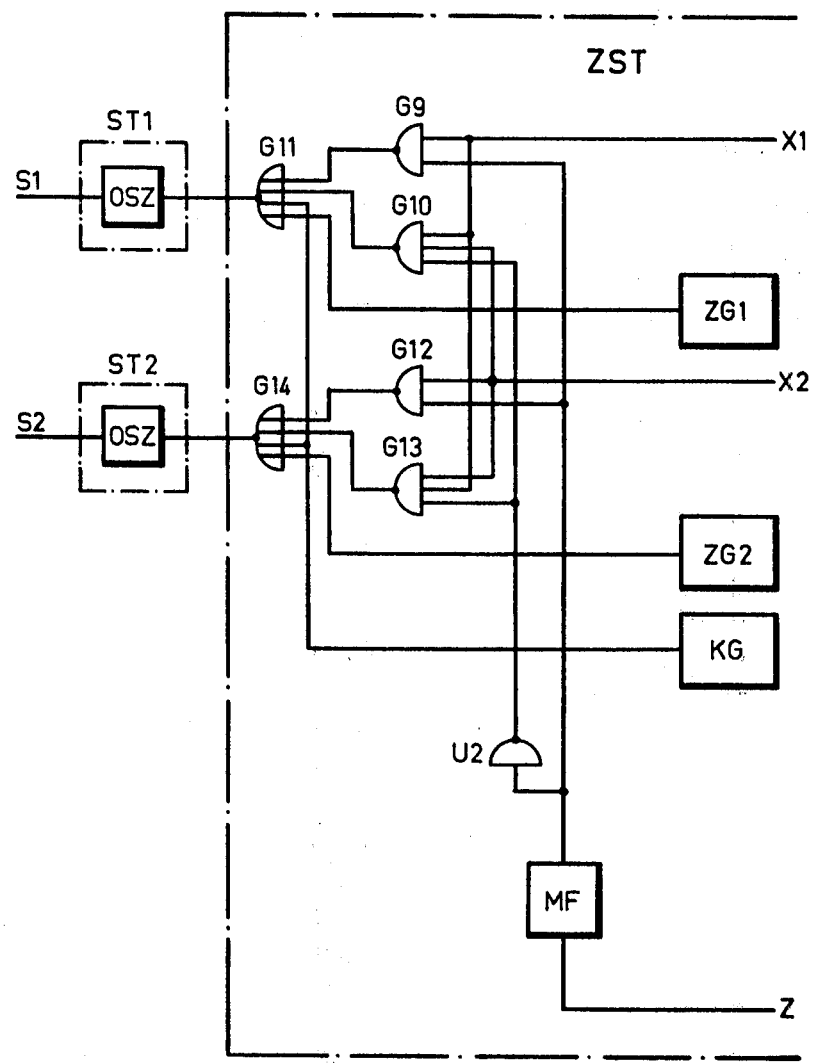
FIG. 3 is a diagram of the circuitry of the common part of the common central control.

FIG. 3 shows the common part of the common central control. The signal on wire X1 connected to the NAND-gate G9 enables the gate, which is prepared by the monostable flip flop MF in its rest position. The signal appears on the output of the NAND-gate G9 which is connected to the OR-gate G11 and is transmitted to the oscillator OSZ of the control unit ST1, which is connected to the output of OR-gate G11. The said oscillator modulates the input signal on wire S1 which is connected to the antenna input of the television set FS1(FIG. 1). The oscillator generates a high frequency which is used as a carrier for the transmission of television signals assigned to a TV-channel. The oscillator OSZ is described in detail in the U.S. Pat. Ser. No. 3,659,285 on page 6 from line 5 to 16 and shown in FIG. 5 (Summer RF-Oscillator Modulator 15).

The signal for the representation of the spot on the television set FS2 is performed in the same manner as described above by the control unit ST2. The actual signal for the spot represented on the screen appears on wire x2 and is transmitted by the enabled NAND-gate G12 and the OR-gate G14 to the oscillator OSZ at the control unit ST2.

As described in FIG. 2 the counters Z1 and Z2 are stepped up within each frame. They are also connected to a read only memory FSP thus controlling the read-out of the memory. The memory is arranged in m lines with each line containing n bits. The control of the selection of the particular line is performed by the counter Z2 while the control of the single bit within a line is controlled by the counter Z1. This means that at each position of both counters a certain storage place within the memory is selected.

As described before counter Z1 is stepped up to its end while the counter Z2 remains on one step and both counters reach their final position within one frame causing the complete read-out of the memory within one frame.

Figure 4:
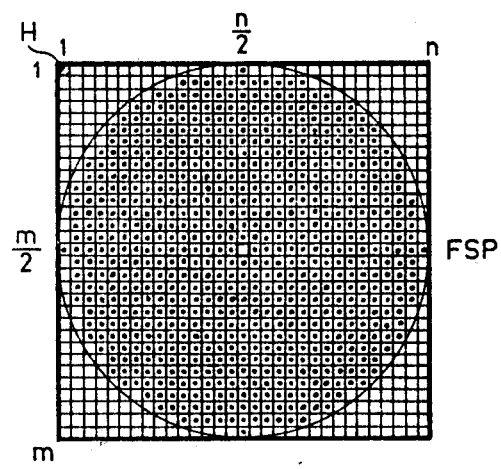
FIG. 4 is a diagram of the bit pattern stored in the read only memory.

The memory FSP contains a circular disk-like bit-pattern shown in FIG. 4. At the starting position at n=1 and m=1 the invisible auxiliary spot H is marked symbolically. This is the spot actually controlled by the control set BD(FIG. 1 and 2), which is used for initiating the read out of the memory. At the position of n/2 and m/2 of the memory FSP the symbolic location of the spot actually represented on the screen is marked, its position is exactly in the center of the circular disk-like bit-pattern forming the assumed field of visibility of the represented spot. This bit-pattern stored in the memory FSP is formed by the bits within the circular pattern representing the information "high" and those bits outside the circular pattern the information "low".

The capacity of the memory depends on the desired field of visibility. If it should stretch over 50 lines with each line containing 50 dots the storing capacity must be 2.5 kbit.

Back to FIG. 2: While the read out of the memory FSP the information stored within the memory appears in series on a wire connected to NAND-gate G6 where the coincidence is checked with the signal on wire x2 from the control unit ST2. This signal controls the presentation of the spot on the television set FS2 as described before.

In case of coincidence between the signal on wire x2 marking the position of the spot controlled by the control set BD2 and a signal out of the memory FSP within the circular disk-like bit-pattern of the control unit ST1 the NAND-gate G6 is enabled, which causes a signal at the output. This signal is transmitted via the OR-gate G8 to the monostable flip flop MG(FIG. 3) on a connection between the NAND-gate G6 and the monostable flip flop MF via OR-gate G8.

The signal sets the monostable flip flop MF which generates a blocking signal having a length of more than one frame and less than two frames. The said signal blocks the NAND-gates G9 and G12, since the blocking inputs of the two gates are connected to the output of the monostable flip flop.

The blocking signal is inverted by the inverter U2 connected to the monostable flip flop MF. The output of this inverter is connected to the NAND-gates G10 and G13, which are enabled by the inverted blocking signal. Since the wires x1 and x2 are connected both to the both gates G10 and G13, the presentation of both spots is performed on the screen of both television sets via the OR-gates G11 and G14 respectively.

The same operation is performed at the NAND-gate G7, where the coincidence check is carried out with signal on wire x1 and the information stored in the read only memory FSP of control unit ST2. A push button switch T can be used at certain moments for initiating the presentation of both spots on the screens of both television sets (FIG. 2) manually.

If the presentation of a vehicle on the screen by a spot in the size of a dot is not sufficient, it can be easily enlarged by using three outputs each of both decoders D1 and D2 instead of one. This can be performed by connecting the outputs n/2−1, n/2 and n/2+1 respectively m/2−1, m/2 and m/2+1 each to an OR-gate having three inputs. The outputs are to be connected to NAND-gate G5 as shown in FIG. 2.

In order to present additionally to the spots on the screens a geographical pattern as coast lines, rivers, mountains and so on, a memory KG is connected to both the OR-gates G11 and G14(FIG. 3). The memory KG contains the necessary information and is read out with each frame, whereby the presentation of the said contours is performed independently of the position of the spots on the screens of both television sets. It is possible to restrict the presentation to the assumed field of visibility of a vehicle by using the method of coincidence as described before.

Individual informtion concerning a spot or vehicle is stored and processed in the units ZG1 and ZG2(FIG.3). These units each contain a generator for the transmission of the information to be shown on the particular screen in the form of alpha-numeric characters. Therefore, each unit ZG1 and ZG2 is connected separately to the OR-gate G11 and G14 respectively.

This information can consist of data about the fuel, range, amount of ammunition, number of hits and so on, is only represented on the screen of the particular television set.

It is possible to activate the coincidence check manually and restrict the check to a sector being formed by the read out of the memory FSP of only one quarter (n/2 times m/2) of the content, wherebythe sector can be selected by special push button switches on the control unit BD.

What is claimed is:

1. A video game system for simulating the functions of vehicles or groups of vehicles represented by spots on the screens of a plurality of television sets or projectors respectively controlled by and associated with individual control sets, said system comprising means connecting both said control sets and television sets or projectors to a common central control means, said central control means limiting the appearance of a respective vehicle or group of vehicles exclusively to the screen of the television set or projector associated therewith when the respective vehicles or groups of vehicles are positioned beyond an assumed field of visibility (horizon) relative to each other, said central control means causing both vehicles or groups of vehicles to appear on both said screens when their respective positions are within the assumed field of visibility relative to each other.

2. Video game system as specified in claim 1 using a read only memory (FSP) having m rows of n-bit each for each television set containing a circular disk-like bit-pattern, which is read out with each frame and the information of the said memory is compared with the information marking the positions of vehicles of other television sets by comparators (G6,G7) whereby in case of coincidence a monostable flip flop having a delay time greater than the endurance of one frame is set controlling the switch-over unit (G9,G10,G12,G13) for the presentation of both vehicles on both screens.

3. Video game system as specified in claim 1 or 2 using an invisible auxiliary spot (H) controlled by the individual control set via the horizontal (HG) and the vertical generator (VG) for the initiation of the read out of the said memory which is controlled by two counters each one for m rows and n columns respectively and the represented spot on the screen is derived from the positions of the said two counters in such a way, that the outputs of two decoders connected each to one of the said counters marking the position n/2 and m/2 of the counters respectively are connected to a common NAND-gate (G5), which generates at coincidence of both signals the signal forming the spot on the screen.

* * * * *